United States Patent
Trossen

(10) Patent No.: US 11,354,106 B2
(45) Date of Patent: Jun. 7, 2022

(54) DEVICE-INITIATED SERVICE DEPLOYMENT THROUGH MOBILE APPLICATION PACKAGING

(71) Applicant: IDAC Holdings, Inc., Wilmington, DE (US)

(72) Inventor: Dirk Trossen, London (GB)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/970,319

(22) PCT Filed: Jan. 29, 2019

(86) PCT No.: PCT/US2019/015670
§ 371 (c)(1),
(2) Date: Aug. 14, 2020

(87) PCT Pub. No.: WO2019/164644
PCT Pub. Date: Aug. 29, 2019

(65) Prior Publication Data
US 2021/0081186 A1     Mar. 18, 2021

Related U.S. Application Data

(60) Provisional application No. 62/634,640, filed on Feb. 23, 2018.

(51) Int. Cl.
*G06F 8/61* (2018.01)
*G06F 9/445* (2018.01)
(Continued)

(52) U.S. Cl.
CPC ............... *G06F 8/61* (2013.01); *G06F 9/445* (2013.01); *G06F 9/455* (2013.01); *H04L 67/34* (2013.01)

(58) Field of Classification Search
CPC . H04L 67/34; G06F 9/455; G06F 8/61; G06F 9/445
See application file for complete search history.

(56) References Cited

U.S. PATENT DOCUMENTS

| 2002/0105972 A1 | 8/2002 | Richter |
| 2008/0021987 A1 | 1/2008 | Bates |
| (Continued) | | |

FOREIGN PATENT DOCUMENTS

| WO | 2017087449 A1 | 5/2017 |
| WO | 2017161562 A1 | 9/2017 |

OTHER PUBLICATIONS

International Search Report and Written Opinion of the International Searching Authority for PCT/US2019/015670 dated Apr. 26, 2019, 10 pages.

(Continued)

*Primary Examiner* — Marina Lee
(74) *Attorney, Agent, or Firm* — Invention Mine LLC

(57) ABSTRACT

One disclosed method includes loading, at a mobile device, a mobile application package from a repository, where the mobile application package contains local application information including local application components and service deployment information. The method further includes (i) extracting, by a package installer on the mobile device, from the mobile application package, the local application information and the service deployment information, (ii) installing, with the package installer, the local application components on the mobile device, (iii) transmitting, from the mobile device to a remote node in a Network Functions Virtualization (NFV) infrastructure, image information to initiate a service deployment, and (iv) and receiving a result of the service deployment at the mobile device.

20 Claims, 11 Drawing Sheets

(51) Int. Cl.
  *G06F 9/455* (2018.01)
  *H04L 29/08* (2006.01)
  *H04L 67/00* (2022.01)

(56) References Cited

U.S. PATENT DOCUMENTS

| | | | | |
|---|---|---|---|---|
| 2011/0173603 | A1* | 7/2011 | Nakamura | G06F 8/65 717/173 |
| 2012/0144387 | A1* | 6/2012 | Yuan | H04L 69/162 717/176 |
| 2014/0029750 | A1 | 1/2014 | Wei | |
| 2014/0032759 | A1 | 1/2014 | Barton | |
| 2014/0317293 | A1 | 10/2014 | Shatzkamer | |
| 2015/0082298 | A1 | 3/2015 | Wang | |
| 2015/0347119 | A1 | 12/2015 | Wang | |
| 2017/0220335 | A1 | 8/2017 | Pink | |
| 2019/0034219 | A1 | 1/2019 | Xu | |

OTHER PUBLICATIONS

SDN Definition, "Software-Defined Networking (SDN) Definition". Web Archive dated Nov. 25, 2017, available at https://web.archive.org/web/20171125100009/https://www.opennetworking.org/sdn-definition/, 4 pages.

Wikipedia, "Network Function Virtualization". Wikipedia article dated Feb. 16, 2018, available at https://en.wikipedia.org/w/index.php?title=Network_function_virtualization&oldid=825964754, 7 pages.

ETSI, "Open Source MANO". Web Archive dated Feb. 8, 2018, available at: https://web.archive.org/web/20180208222059/http://www.etsi.org/technologies-clusters/technologies/nfv/open-source-mano, 1 page.

Trossen, Dirk, "FLAME D3.3: FLAME Platform Architecture and Infrastructure Specification V1". FLAME Consortium, Aug. 9, 2017, pp. 1-92.

ETSI, "Network Functions Virtualisation (NFV) Release 2; Management and Orchestration; Functional Requirements Specification". ETSI Group Specification, ETSI GS NFV-IFA 010 V2.3.1, Aug. 2017, pp. 1-57.

OASIS, "TOSCA Simple Profile for Network Functions Virtualization (NFV) Version 1.0". Available at http://docs.oasis-open.org/tosca/tosca-nfv/v1.0/tosca-nfv-v1.0.html, May 11, 2017, 45 pages.

Cimmino, Antonio, et. al., "Requirements and Use Cases System for Virtualized Network Functions Platforms". Journal of Telecommunications System & Management, vol. 3, Issue 2, (2014), pp. 1-10.

Ziegler, Jens, et. al., "Beyond App-Chaining: Mobile App Orchestration for Efficient Model Driven Software Generation". Proceedings of IEEE 17th International Conference on Emerging Technologies & Factory Automation (ETFA 2012), (2012), 8 pages.

"Overview of Docker Compose". Web Archive dated Oct. 3, 2017, available at: https://web.archive.org/web/20171003131827if_/https://docs.docker.com/compose/overview/, 8 pages.

International Preliminary Report on Patentability for PCT/US2019/015670 dated Aug. 27, 2020, 7 pages.

* cited by examiner

DEVICE-INITIATED SERVICE DEPLOYMENT THROUGH MOBILE APPLICATION PACKAGING

CROSS-REFERENCE TO RELATED APPLICATIONS

The present application is a national stage application under 35 U.S.C. § 371 of International Application No. PCT/US2019/015670, entitled "DEVICE-INITIATED SERVICE DEPLOYMENT THROUGH MOBILE APPLICATION PACKAGING," filed on Jan. 29, 2019, which claims benefit under 35 U.S.C. § 119(e) from U.S. Provisional Patent Application Ser. No. 62/634,640, filed Feb. 23, 2018, entitled "Device-Initiated Service Deployment through Mobile Application Packaging," each of which is incorporated herein by reference in its entirety.

BACKGROUND

For many Internet users, mobile application ecosystem drives an experience in which much of the specific connectivity and access to specific servers is hidden. Instead, users experience a simplified procedure of downloading and installing a specific mobile application, typically via a portal such as a mobile application store. In such case, the necessary configuration at the system and network level comes fully integrated into the mobile application and the user sees primarily only user-facing configuration, such as user names or passwords to application-specific accounts.

Currently, there is also an emerging trend of moving towards programmable networks, where, for example, communication, computation and storage are provided as general resources, accessible via platform technologies such as Software-Defined Networking (SDN) (see, e.g., a SDN definition, available at www.opennetworking.org/sdn-definition/) and Network Functions Virtualization (NFV) (see, e.g., a NFV definition, available at en.wikipedia.org/wiki/Network_function_virtualization). Generally speaking, in NFV, various hardware functionality needed to deploy a given service can be implemented in software using, e.g., industry standard high-volume servers, switches, and storage. More specifically, NFV separates network functions from the hardware they run on by using virtual hardware abstraction. NFV can add capabilities to communications networks, along with adding a new set of management and orchestration functions to operations, administration, maintenance, and provisioning. In this regard, for example, an NFV Management and Orchestration (NFV-MANO) architectural framework manages the infrastructure and orchestrates resources needed by Network Services (NSs) and Virtualized Network Functions (VNFs). SDN, on the other hand, refers to a technology that generally centralizes network intelligence by separating network control plane (e.g., a routing process) from the forwarding plane (e.g., a process of forwarding network packets), where the control plane controls several network devices. The NVF and SDN are complementary technologies, but do not depend on each other and may be implemented separately from each other or in combination.

SUMMARY

Example procedures, methods, and architectures for deployment of NFV/SDN-based service(s) through mobile application packaging are disclosed in accordance with some embodiments. In some embodiments, device-initiated service deployment occurs as a part of mobile application installation. To illustrate, according to some embodiments, a package installer having an extended functionality, realized in a mobile device (e.g., a mobile terminal), may be configured to extract service orchestration information, from a mobile application package, install local application components, and initiate service deployment in an NFV infrastructure or other similar network infrastructure (e.g., an orchestrated network infrastructure that deploys given service(s) as instructed). In some embodiments, device-initiated service deployment may occur with a full involvement of an Operation Support System/Business Support System (OSS/BSS). In some embodiments, the OSS/BSS may be used, e.g., only for insertion of provided service images into an infrastructure repository. In yet some other embodiments, the OSS/BSS may be omitted altogether.

According to some embodiments, a method includes: at a mobile device, loading a mobile application package from a repository, the mobile application package containing local application information including local application components and service deployment information; extracting, by a package installer on the mobile device, from the mobile application package, the local application information and the service deployment information; installing, with the package installer, the local application components on the mobile device; transmitting, from the mobile device to a remote node in a Network Functions Virtualization (NFV) infrastructure, image information to initiate a service deployment; and receiving a result of the service deployment at the mobile device.

In some embodiments, the method further includes providing to a user, on the mobile device, an indication of a result of an overall mobile application installation. In some embodiments, the image information includes image insertion instructions, and the mobile device transmits the image insertion instructions to an Operation Support System/Business Support System (OSS/BSS) of the NFV infrastructure. Further, in some embodiments, the method further includes the OSS/BSS communicating service deployment instructions to an orchestrator.

According to some embodiments, the OSS/BSS communicates the service deployment instructions to the orchestrator after performing a successful authentication, authorization, and accounting (AAA) procedure. In some embodiments, the image information includes one or more links to respective images, and the mobile device transmits the one or more image links to an orchestrator. In other embodiments, the method further includes the mobile device transmitting the service deployment instructions to an orchestrator. In yet other embodiments, the method further includes, responsive to receiving the service deployment instructions, the orchestrator deploying a service and reporting the result of the service deployment to at least the mobile device.

According to some embodiments, another method includes: at a mobile device, downloading a mobile application package from a mobile application repository; and extracting local application information and service deployment information from the mobile application package to cause: (a) a local application installer at the mobile device to install local application components on the mobile device, according to the extracted local application information, (b) an Operation Support System/Business Support System (OSS/BSS) to insert service images into a service deployment repository, and (c) an orchestrator to deploy a service in a programmable network, according to the extracted service deployment information.

In some embodiments, the method further includes receiving a result of the service deployment from the orchestrator at the mobile device. In some embodiments, the result of the service deployment is received at the OSS/BSS, and receiving the result of the service deployment from the orchestrator includes receiving the result from the OSS/BSS. In one example, the programmable network includes Network Functions Virtualization (NFV) infrastructure. In another example, the programmable network is a combination of a Network Functions Virtualization (NFV) infrastructure and a Software-Defined Networking (SDN) infrastructure. Further, the mobile application repository may be an application store, and a mobile application packaged in the mobile application package may be a download option from the application store.

In accordance with some embodiments, the method further includes notifying a user of the mobile device of a result of an overall mobile application installation. In some embodiments, notifying the user of the mobile device of the result of the overall mobile application installation is based on the result of the service deployment and a result of the local installation of the local application components on the mobile device. Further, in some embodiments, if the overall mobile application installation is successful, functionality of the downloaded mobile application is at least partially virtualized.

Further, some embodiments include a system and a mobile device configured (e.g., having a processor and a memory (a non-transitory computer-readable medium), storing instructions for execution by the processor)) to perform the methods described herein.

The entities, connections, arrangements, and the like that are depicted in, and in connection with, the various figures are presented by way of example and not by way of limitation. As such, any and all statements or other indications as to what a particular figure depicts, what a particular element or entity in a particular figure is or has, and any and all similar statements, that may in isolation and out of context be read as absolute and therefore limiting, may only properly be read as being constructively preceded by a clause such as "In at least one embodiment, . . . ." For brevity and clarity of presentation, this implied leading clause is not repeated ad nauseum in the detailed description of the drawings.

DETAILED DESCRIPTION

Figure 1A:
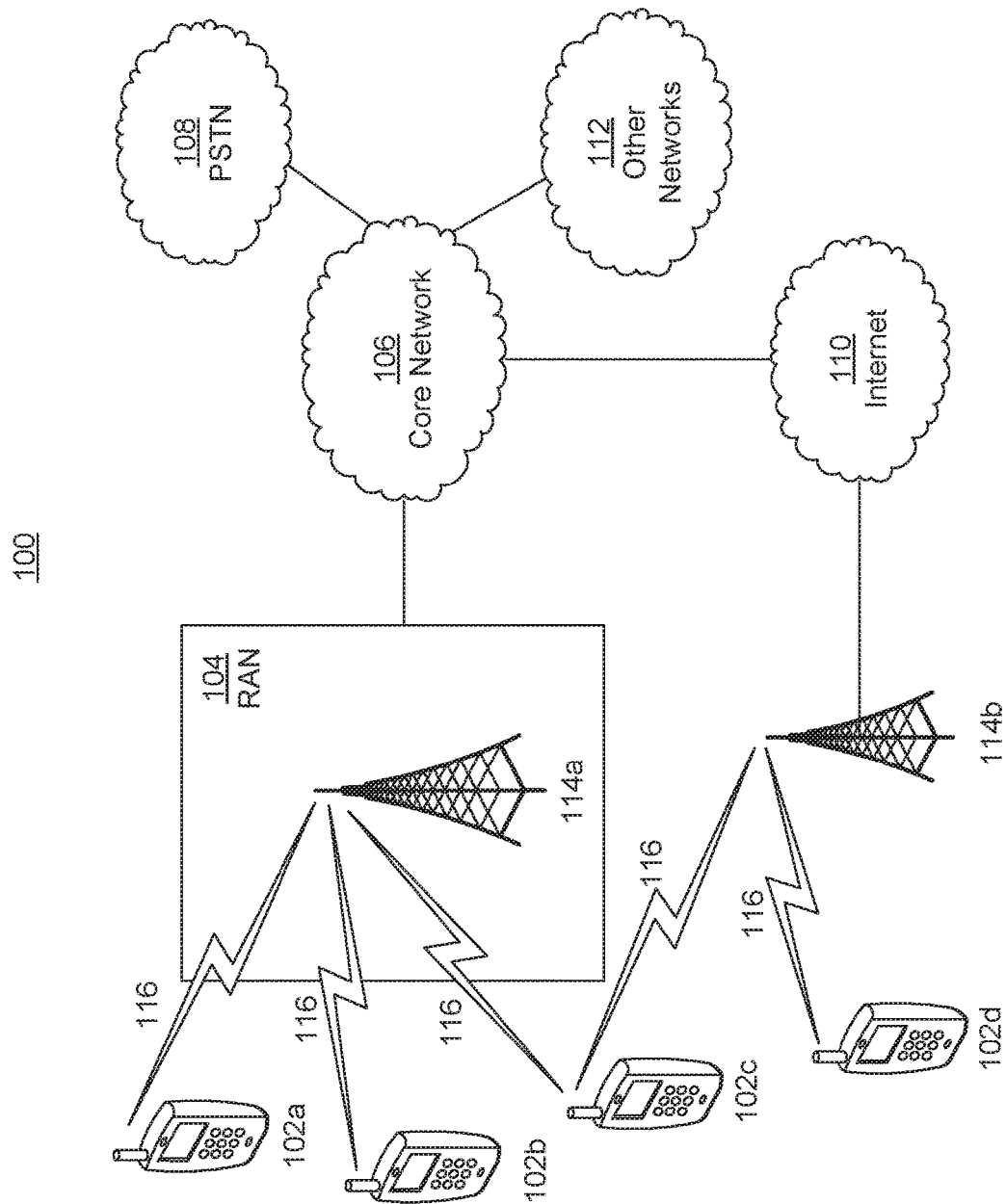
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
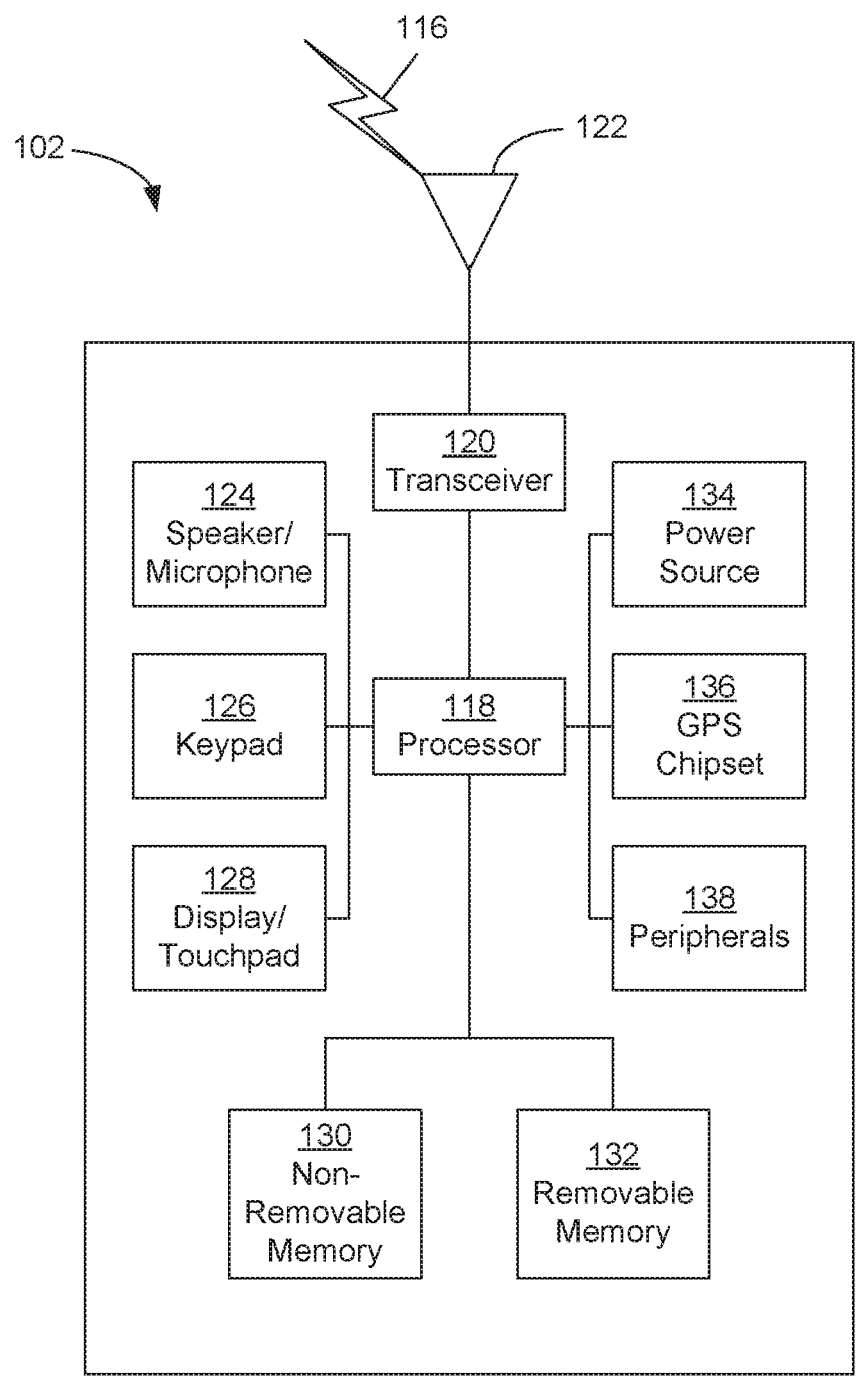
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may be further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
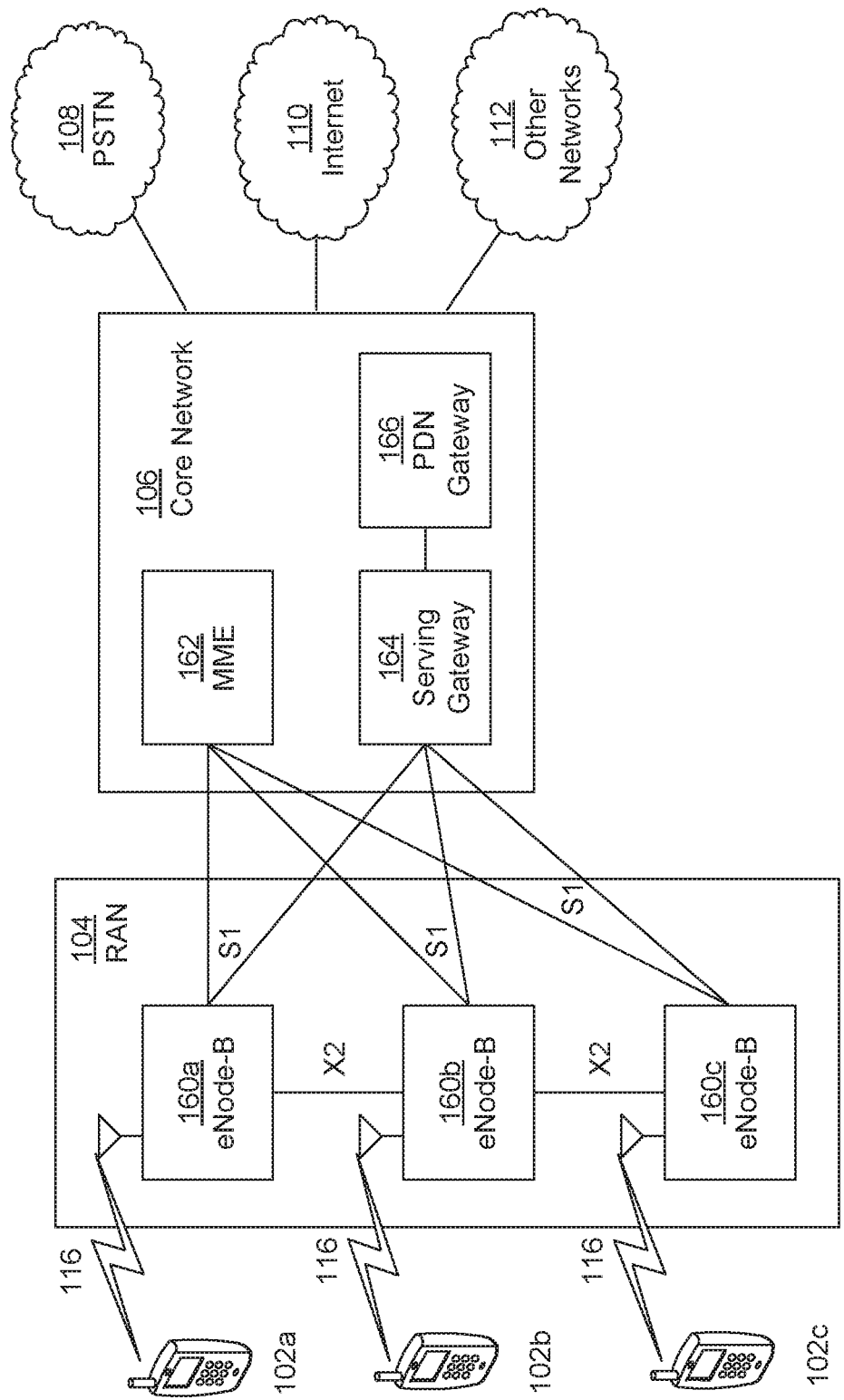
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
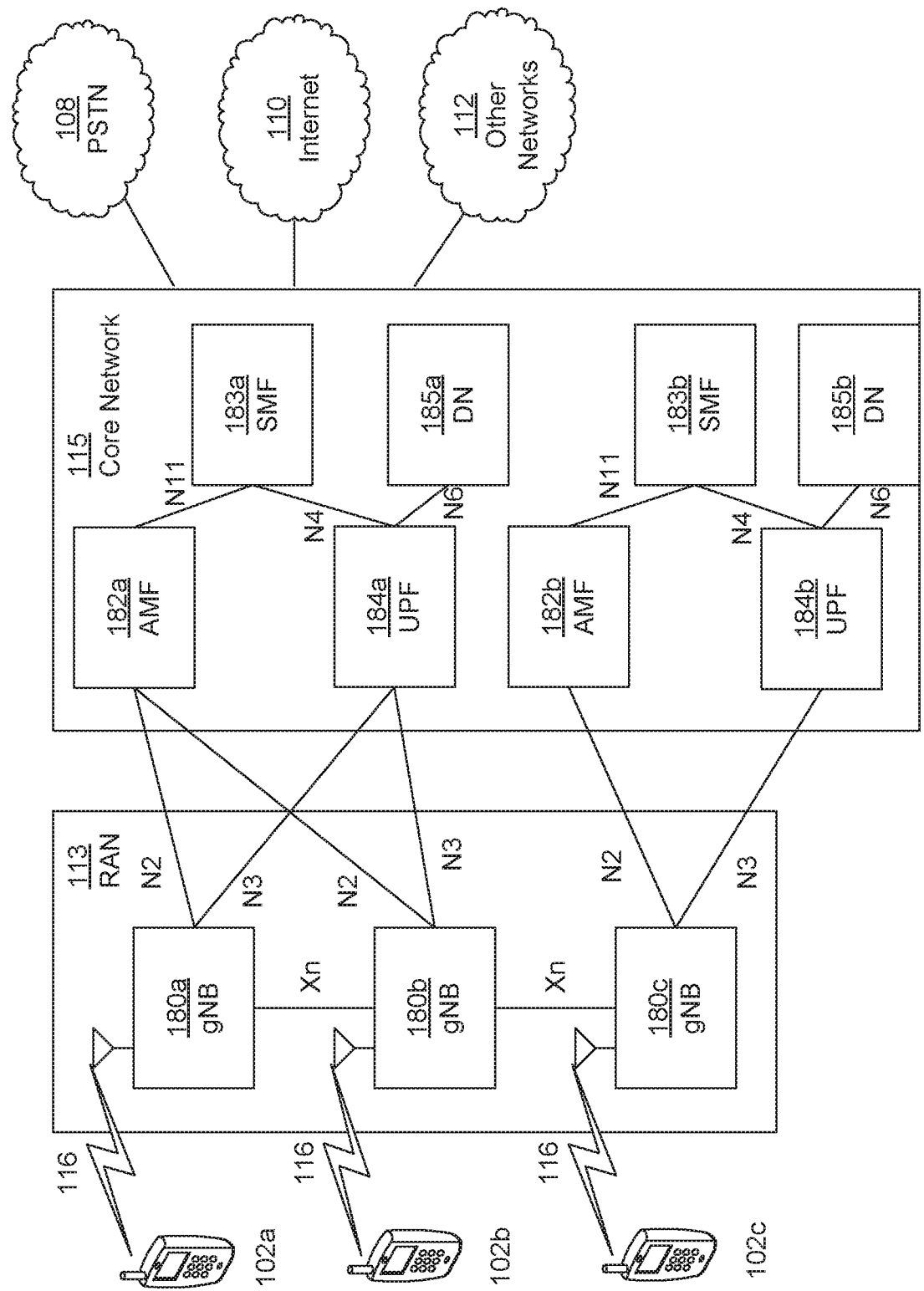
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

As noted above, example procedures, methods, and architectures disclosed herein provide for deployment of NFV/SDN-based service(s) through mobile application packaging. According to some embodiments, an installation of a mobile application on a mobile device triggers an NFV infrastructure to deploy a corresponding service on a network. One advantage of programmable networks is that such networks allow for deploying service functionality deep in the network.

In general, platform development solutions such as such as those in ETSI MANO (see, e.g., Open Source MANO, at www.etsi.org/technologies-clusters/technologies/nfv/open-source-mano) (e.g., NFV/SDN platform technologies) or, e.g., those developed in the H2020 FLAME project (see, e.g., H2020 FLAME project deliverable D3.3, "D3.3: FLAME Platform Architecture and Infrastructure Specification V1", Sep. 8, 2017) allow for distributed Internet-based services to be deployed on such platform technologies. The service deployment may be initiated through an orchestration request sent towards an orchestrator, e.g., an NFV-based orchestrator, where the orchestration request may be sent, for example, through an interface, such as the Os-Ma interface, such as sent through an Operation Support System/Business Support System (OSS/BSS). Such process usually represents a longer-term relationship between a service provider and an NFV infrastructure provider.

Further, many end users currently still experience the Internet through the process of downloading and installing mobile applications onto their mobile devices. In this process, all system and network configuration may generally arrive fully integrated into the mobile application package. Various embodiments of the present disclosure combine the above-noted two approaches to provide a solution in which an installation of a mobile application onto a mobile device triggers a deployment (e.g., a deployment through an orchestration process) of any in-network service elements that may be needed for mobile application execution. This can be done transparently to an end user, such as through the process of downloading a mobile application via existing portals and the following application installation process on the mobile device.

Advantageously, in some embodiments, at least some of the service functionality of the mobile application may be offloaded onto a programmable network for virtualization, allowing, for example, for what may be a more efficient utilization of a service provider's (e.g., a mobile carrier's) resources. At the same time, the disclosed embodiments may preserve the user experience of a user downloading the mobile application from an application portal/store, followed by an installation of the application and its corresponding service(s) locally on the mobile device of the user.

Additionally, in some embodiments, by triggering network service virtualization through a mobile application installation, a service provider (e.g., a mobile network operator) may not have to perform a wide deployment of given service(s) associated with mobile applications across the service providers existing infrastructure. Instead, upon an installation process of a mobile application, in accordance with some embodiments, a mobile device may dynamically or "on the fly" utilize local orchestration points (e.g., a NFVO (NFV Orchestrator) within a particular local NFVO infrastructure), such as, for example, depending on a physical (e.g., geographical) location of the mobile device. Hence, the mobile application may no longer be operator-centric or operator-owned (e.g., may no longer require back-and-forth communication with the operators network (e.g., core network elements coupling a mobile device to the Internet)).

Figure 2:
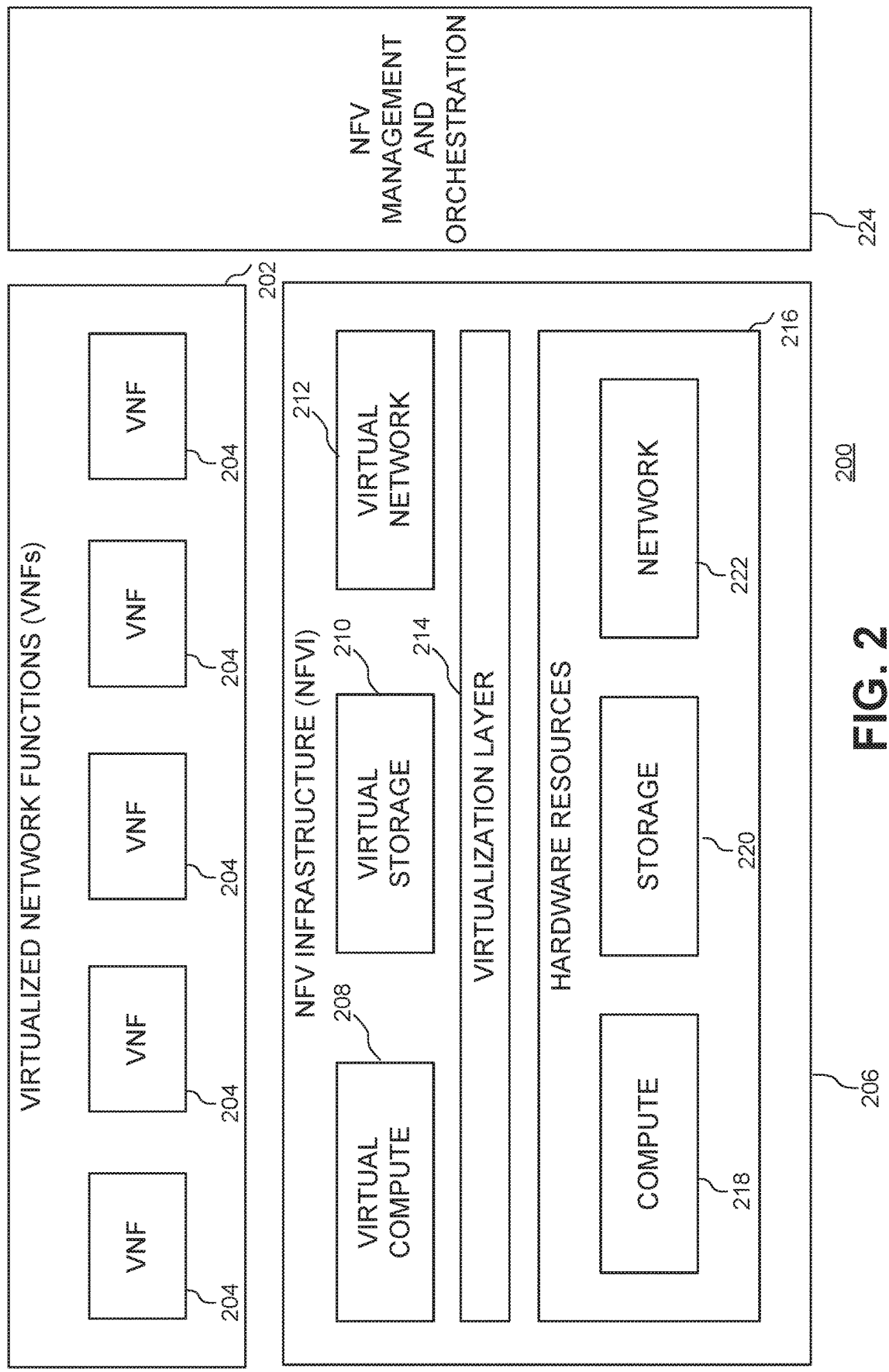
FIG. 2 illustrates a high-level framework of one type of a programmable network, a Network Functions Virtualization (NFV) framework, in which some example embodiments may be implemented.

FIG. 2 illustrates a high-level framework of one type of a programmable network, an NFV framework 200, in which some example embodiments may be implemented.

As shown in FIG. 2, the NFV framework 200 includes a Virtualized Network Functions (VNFs) portion 202 including a number of VNFs 204. As a general matter, a NS (Network Service) may be a composition of Network Function(s) (NF(s)). A NF generally refers to a functional block within a network infrastructure, such as a network node or a physical appliance. For example, in non-virtualized networks, NFs are typically implemented as a combination of vendor-specific software and hardware that are referred to as network nodes or elements. In contrast, when virtualized, a given NS may be implemented as one or more Virtualized NFs (VNFs). VNFs are software implementations of network functions (NFs) that are capable of running over an NFV Infrastructure (NFVI) 206. Hence, essentially, a VNF is a virtualization of a network function in a legacy non-virtualized network.

The NFVI 206 supports, e.g., the execution of the VNFs 204 and may typically include all hardware and software components which provide an environment to support the execution of the VNFs 204. A virtualization layer (e.g., a hypervisor) 214 abstracts, e.g., hardware resources and decouples the VNF software from the underlying hardware, and, e.g., enables the software that implements the VNFs 204 to use the underlying virtualized infrastructure. As shown, the NFVI 206 may include software resources such as a virtual compute portion 208, a virtual storage portion 210, and a virtual network portion 212, and hardware resources 216 such as a compute portion 218, a storage portion 220, and a network portion 222. Note that hardware in the NFVI 206 may be general purpose rather than custom-built. Further, the NFVI 206 may span across several locations, e.g., multiple PoPs (Points of Presence) (e.g., data center(s), network node(s), customer premise(s), etc.) and any network providing connectivity between these locations may be regarded as a part of the NFVI 206.

Note that, the term "NFV infrastructure" used herein in accordance with some embodiments generally refers to an overall architectural NFV framework rather than specifically to a "NFVI" element of the NFV framework. If such specific reference is intended to be made hereinafter, the abbreviation "NFVI" will be used to refer to such element. Further note that various embodiments involving an NVF infrastructure are provided herein for illustrative purposes only and are not intended to be exhaustive. In some (e.g., other) embodiments, for instance, it may be possible to utilize other types of programmable network(s)/virtualization platform(s) (e.g., Docker-based, Linux-based, FLAME-based (as noted above) platforms, etc.) for implementing various functionality described herein in accordance with some embodiments.

As further shown in FIG. 2, the NFV framework 200 includes an NFV Management and Orchestration (NFV-MANO) 224. In general, the NFV-MANO 224 covers, e.g., the orchestration and lifecycle management of physical and software resources (e.g., VNFs) that support network virtualization. NFV-MANO manages virtualization-specific tasks that may be necessary within an NFV framework. For instance, the NFV-MANO 224 supports a lifecycle management. The lifecycle management refers to a set of functions required to manage the instantiation, maintenance and termination of VNFs 204.

In summary, the NFV framework 200 generally enables a dynamic construction and management of VNF instances (run-time instantiation of the VNF software) and the relationships among them in regard to data, control, management, dependencies, and/or other attributes.

Figure 3:
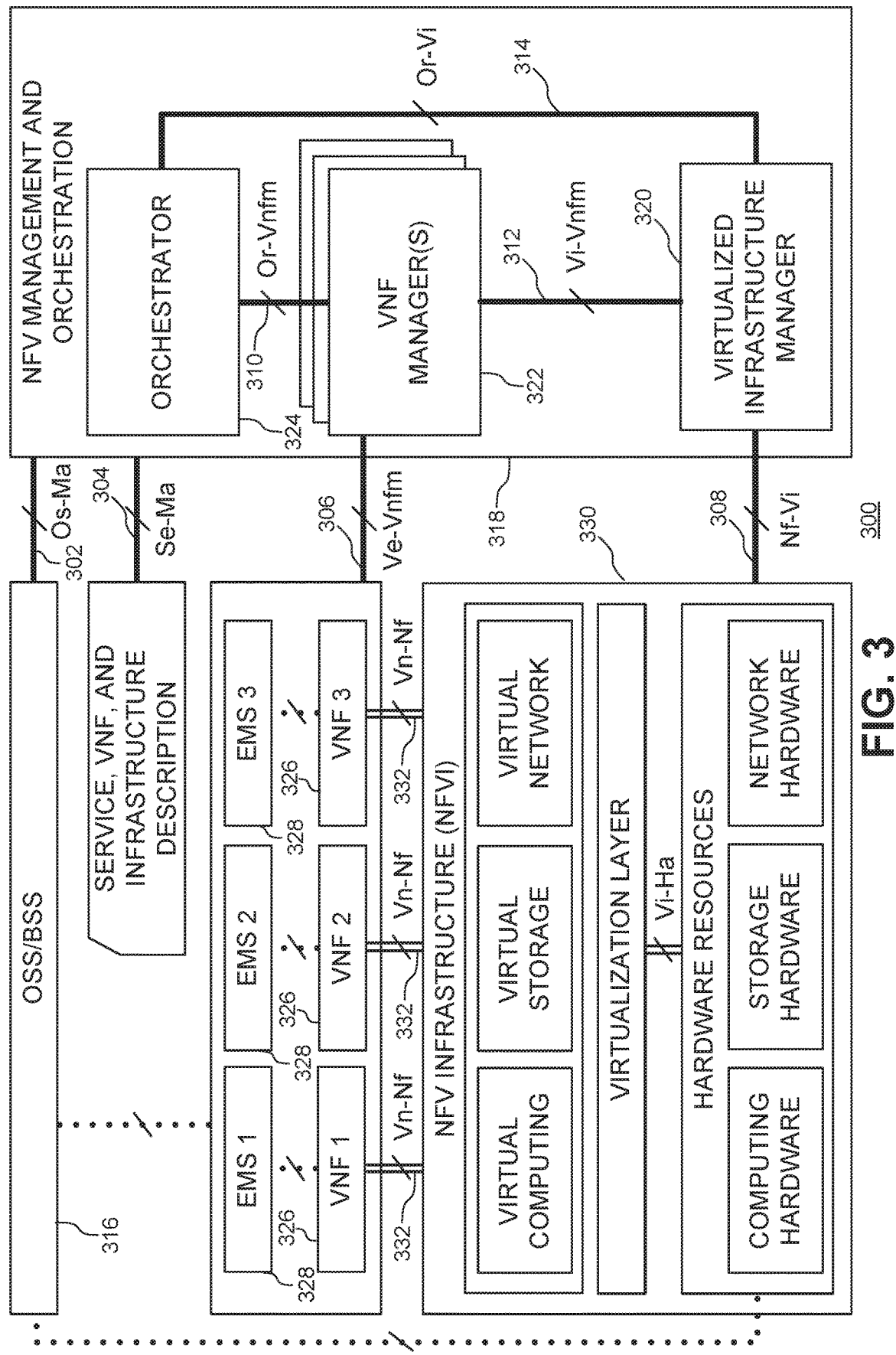
FIG. 3 illustrates a Network Functions Virtualization (NFV) framework in more detail, in accordance with some embodiments.

FIG. 3 illustrates an NFV framework 300 in more detail, in accordance with some embodiments. FIG. 3 shows functional blocks and reference points within an architecture of the NFV framework 300. Main reference points are shown as short solid lines crossing a longer one solid line, and include an Os-Ma reference point 302, a Se-Ma reference point 304, a Ve-Vnfm reference point 306, a Nf-Vi reference point 308, an Or-Vnfm reference point 310, a Vi-Vnfm reference point 312, and an Or-Vi reference point 314.

The Os-Ma reference point 302 is a reference point or interface between an OSS/BSS 316 and NFV Management and Orchestration (NFV-MANO) 318 and is used, e.g., for (1) requests for network service lifecycle management, (2) requests for VNF lifecycle management, (3) forwarding of NFV-related state information, (4) policy management changes, (5) data analytics exchanges, (6) forwarding of NFV-related accounting and usage records, and (7) NFVI capacity and inventory information exchanges. An OSS part of the OSS/BSS 316 is the Operation Support System, and a BSS part of the OSS/BSS 316 is the Business Support System. The Os-Ma reference point (interface) 302 may be utilized in various embodiments described herein, as will be described below. Although not addressed herein in detail, the remaining reference points 304-314 provide a variety of other functions between respective entities they interconnect.

A Virtualized Infrastructure Manager (VIM) 320, e.g., manages the NFV infrastructure resources (computing, networking, and storage) in one or more NFVI points of presence (NFVI-PoPs) (e.g., data center(s), network node(s), and/or end-user premise(s), etc.). The VIM 320 also, e.g., exposes virtualized resource management interfaces and application programming interfaces (APIs) to the VNF Manager(s) (VNFM(s)) 322 and an NFV Orchestrator (NFVO, "Orchestrator") 324. The VIM 320 further, e.g., sends virtualized resource management notifications to the VNFM 322 and the NFVO 324.

One of the management functions performed by the VIM 320 is a management of software images (e.g., management of add, delete, update, query, and copy functions) as requested by other NFV-MANO functional blocks (e.g. the NFVO 324). While not explicitly shown in the NFV-MANO architectural framework, in some embodiments, the VIM 320 may typically also maintain one or more repositories for software images such as to streamline the allocation of virtualized computing resources. The function of images, in accordance with some embodiments, will be generally described later in more detail.

The VNFM 322, e.g., manages the lifecycle of VNFs 326 and VNF initial configuration via the interfaces exposed by the VNFs 326. As shown in FIG. 3, the VNFs 326 are coupled to a NFVI 330 (described above in connection with FIG. 2) via Vn-Nf execution reference points 332. The VNFM 322 also, e.g., sends VNF lifecycle management notifications to the VNFs 326 and Element Management Systems (EMSs) 328, and manages virtualized resources associated with the VNF that the VNFM 322 manages.

The NFVO ("Orchestrator") 324, e.g., manages the lifecycle of NSs (Network Services), exposes NS lifecycle management interfaces to the OSS/BSS 316, sends NS lifecycle management notifications to the OSS/BSS 316, and manages virtualized resources via the interfaces exposed by the VIM 320. The NFVO 324 also exposes virtualized resource management interfaces to the VNFM 322, sends virtualized resource management notifications to the VNFM 322, and manages the VNF lifecycle via the interfaces exposed by the VNFM 322.

The NFV-MANO 318 architectural framework, e.g., manages the infrastructure and orchestrates the resources needed by the NSs and VNFs (e.g., the VNFs 326). Additionally, the NFV-MANO 318 enables, e.g., different models, per resource type, to facilitate availability of resources and to avoid resource contention. Multi-tenancy can be applied to all infrastructure and service resources which can be consumed from an NFV system and managed by the NFV-MANO 318.

Figure 4:
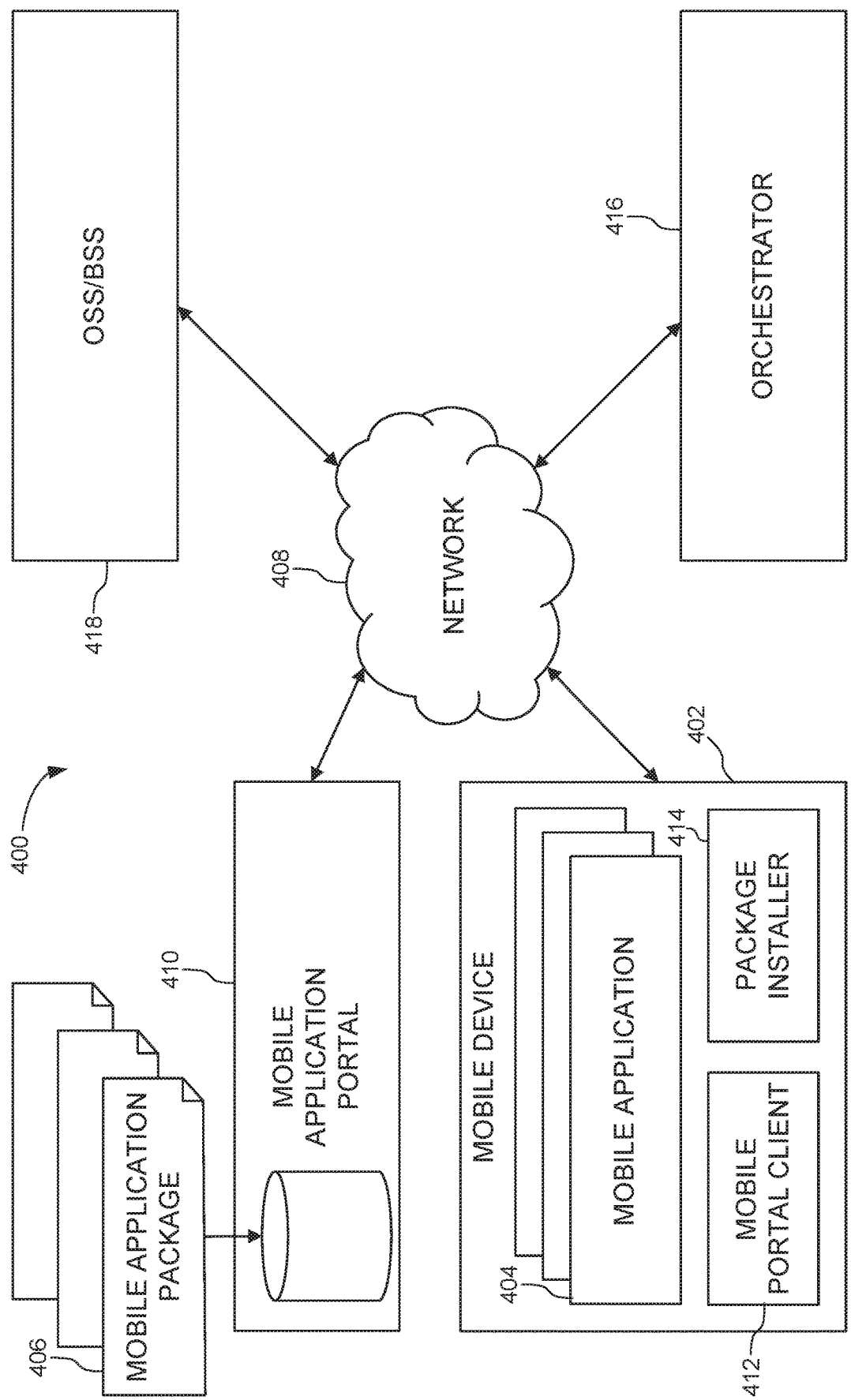
FIG. 4 illustrates an example network arrangement in which some embodiments may be employed.

In some embodiments, NFV and SDN infrastructures may be leveraged to provide platforms for preserving, from an appearance perspective to a user, a user experience of "downloading" a mobile software application (commonly referred to as an "app") from a store (or from, e.g., another web-based portal) and "installing" the app, even when a service corresponding to the app is virtualized. That is, what is often a common user experience can be partially or fully preserved, from the users perspective, even if the application functionality is not contained entirely on a local user mobile device. FIG. 4 illustrates an example network arrangement 400 in which some embodiments may be employed.

As shown, the network architecture 400 includes a mobile device 402. The mobile device 402 includes one or more mobile applications (apps) 404. A mobile application package 406 containing local application information and service orchestration information (also referred to herein as "service deployment information") (not shown) for each respective application is downloaded over a network 408 from a mobile application portal 410 via a mobile portal client 412 and installed through a package installer 414. The network 408 may be any combination of wireless and wired networks (e.g., a RAN and core network of a service provider, an 802.11 WLAN, etc.) The package installer 414 may be configured to execute any needed processes for installing the application 404 locally, as well as initiating any needed orchestration steps for a wider service deployment.

In some embodiments, the package installer 414 is triggered by a download of the mobile application package 406 from the mobile application portal 410 for installation. In some (e.g., other) embodiments, the package installer 414 may be triggered by a download or, e.g., a transfer (e.g., copying) of the mobile application package 406 from a different source, such as, e.g., from another local source. In general, during so-called 'sideloading,' a mobile application package may be downloaded from a trusted source onto a given local device (e.g., a USB drive) and transferred onto another local device, such as a user's mobile device. To illustrate, according to an example, the mobile application package 406 may be transferred or copied onto the mobile device 402 via a file transfer from a USB drive coupled to the device 402 rather than being downloaded directly from the mobile application portal 410.

In some embodiments, the package installer 414 communicates with an orchestrator 416 (e.g., through the network 408), such as an NFVO (e.g., the NFVO 324 in FIG. 3), as described below. In the present example, an NFV and its architecture (see, e.g., ETSI GS NFV-IFA 010, V2.3.1, "NFV Network Functions Virtualisation (NFV) Release 2; Management and Orchestration; Functional requirements specification," August 2017, available, e.g., at www.etsi.org/deliver/etsi_gs/NFV-IFA/001_099/010/02.03.01_60/gs_NFV-IFA010v020301p.pdf) constitutes an example of an orchestrator-based network infrastructure that may deploy a given service as instructed in accordance with some embodiments. However, in other embodiments, another orchestrated network infrastructure may be used instead or in addition (e.g., an orchestrator-based infrastructure being developed in the FLAME project as referenced above).

In some embodiments, as an entry point to the orchestrator-based infrastructure, an OSS/BSS 418 may provide a suitable interface (e.g., northbound interface), as described below. Utilizing the OSS/BSS, e.g., rather than, e.g., the orchestrator 416 directly may allow for the integration of service deployment with authorization and billing for that service deployment. In some embodiments, the OSS/BSS 418 may also be used for initiating the insertion of service compute/storage images (also herein referred to as "images," "service images," "service endpoint images," and "software images") into the orchestrator-based infrastructure repository. However, in other embodiments, orchestrator-based image insertion can also be employed using an appropriate interface being provided by the orchestrator 416. In this regard, for example, a deployment template (as will be described in more detail below) contained in the mobile application package 406 may include, e.g., link(s) (e.g., web link(s)) associated with image location so that the orchestrator 416 may 'pull' image(s) directly using those image link(s).

Some examples in accordance with some embodiments for packaging of orchestration-enabled mobile applications will now be described.

Packaging of mobile applications may typically follow documented guidelines that are often driven by development platforms. For example, the Android® development platform provides packaging tools to generate a single Android® application package (APK) file that encapsulates the executable code as well as any assets (such as graphical symbols, images, and/or the like) that are being used by the installed application. The packaging information also includes any installation instructions necessary for a package installer to perform the local install on a mobile device, such as the install of required interface levels, required local libraries and alike. Systems such as a desktop Linux, as well as Windows, provide similar installation packaging system.

Similarly, "packaging" information for orchestrated services, such as those based on NFV, also generally follow a defined packaging format. In the case of NFV-based environments, as well as those proposed in the FLAME architecture, the packaging instructions may be described in the OASIS Topology and Orchestration Specification for Cloud Applications (TOSCA) mark-up language. See. e.g., OASIS, "TOSCA Simple Profile for Network Functions Virtualization (NFV) Version 1.0," May 11, 2017, available, e.g., at docs.oasis-open.org/tosca/tosca-nfv/v1.0/tosca-nfv-v1.0.html.

In general, software that implements, for example, a given VNF may be structured into software components that are packaged into one or more images (or software images, as referred to in the NFV nomenclature). As those skilled in the art will understand, in general, an image is a file that becomes a container or virtual machine at runtime, or in other words, is an instance of a container or virtual machine. A container generally refers to software that packages up code and all its dependencies to run an application in an isolated environment. In general, containers virtualize an operating system, splitting it up into virtualized compartments to run container applications. A specific VNF may be run in one or more containers. In some examples, an image may be in the form of, for instance, a TAR (Tape ARchive) file that may be extracted into a container format. In other examples, various other image formats may be employed (e.g., Open Virtualization Format (OVA) (such as used, e.g., for VirtualBox and VMWare)).

Unlike virtual machines, containers can run applications in isolation on the same operating system, without the use of, e.g., a hypervisor. In general, in some embodiments, a hypervisor refers to computer software, firmware and/or hardware that creates and runs virtual machines, and that allows a computer to run more than one operating system (OS). One example of a container is a Docker container. Docker containers may be stored on a network as images which, in turn, may be loaded on a host operating system for execution when needed. Note, however, that, as used herein in accordance with some embodiments, an "image" may be generally referred to any file used to deploy either a container or another form of an environment in which a virtualized function/service can run, such a virtual machine for instance. Further, as a general matter according to some embodiments, in NFV, a deployment and operational behavior requirements of each NS may be captured in a deployment template that is stored during the NS on-boarding process in a catalogue for instantiation. Note that on-boarding in the context of at least NFV generally refers to a process of integrating a new service/function into the NFV network. Such deployment template is typically called a network service descriptor (NSD) and describes, for example, a relationship between VNFs (and possibly Physical Network Functions (PNFs)) that a NS may contain and any links that may be needed to connect the VNFs. More specifically, in some embodiments, an NSD is a template that describes the deployment of a NS including service topology including, e.g., constituent VNFs and the relationships between them, Virtual Links, VNF Forwarding Graphs, as well as other NS characteristics/attributes needed to realize the NS. In some embodiments, the NSD may be implemented using TOSCA. Additionally, in some embodiments, an NSD may reference all other descriptors (e.g., a VNF (Virtual Network Function) descriptor (VNFD)) which describe components that are part of that NS.

In this regard, TOSCA may also be used to specify one or more necessary VNFDs for deployment of VNF(s). In general, in some embodiments, a VNFD is a configuration template that describes a VNF in terms of the VNF's deployment and operational behavior. The VNFD is typically used in the process of VNF on-boarding and managing the lifecycle of a VNF instance (run-time instantiation of the VNF software). In some embodiments, the information provided in the VNFD is used, e.g., by a NFVO to manage and orchestrate NSs and virtualized resources on a NFVI. As an example, in an NFV framework, before a VNF can start its lifecycle, the VNF is normally registered with a NFVO and the corresponding VNF data (e.g., a VNFD, images (e.g., SW images), etc.) is uploaded and stored.

As noted above, packaging instructions for orchestrated services may be specified using TOSCA. Such instructions may contain, for instance, information on links to SW images (or generally images) to be deployed, e.g., as virtual machines or containers, network interface information, IP address assignment and other information to configure any needed service endpoints in the system. Code instructions and storage assets are usually linked to from the packaging (as, e.g., packaging information including image links), rather than directly incorporated into the packaging itself.

However, in some embodiments, it may be possible that VM/container image information could be packaged into the same file containing the instructions (e.g., TOSCA-based instructions) for making use of them. For instance, in the context of NFV, a so-called VNF Package may be submitted by a sending entity. The VNF Package may include NFD(s), associated images(s), etc. A NFVO that on-boards such package may, among other functions, validate the integrity and authenticity of the package, catalog it, and make the images available to a VIM that (as noted above) typically includes a repository for storing images.

Hence, in some embodiments, when an image information is packaged into the same file containing, e.g., TOSCA-based service deployment instructions contained in an orchestration template, the package installation may require publishing a respective image into a suitable NFV repository (e.g., an image repository within a VIM). In contrast, when the packaged information contains image links, the provided TOSCA-based instructions may be parsed and execute to use the image links. As another example, in some embodiments, the image information could be expressed as Docker charts (see, e.g. "Docker Compose," available at docs.docker.com/compose/), with the orchestration framework being based on docker compose as part of, e.g., a data center cloud (single point of presence) realization of the remote service components. In this regard, a Docker chart is generally similar to TOSCA description such that it can provide deployment information for various Docker images, image linkage through virtual connection(s), etc.

Figure 5:
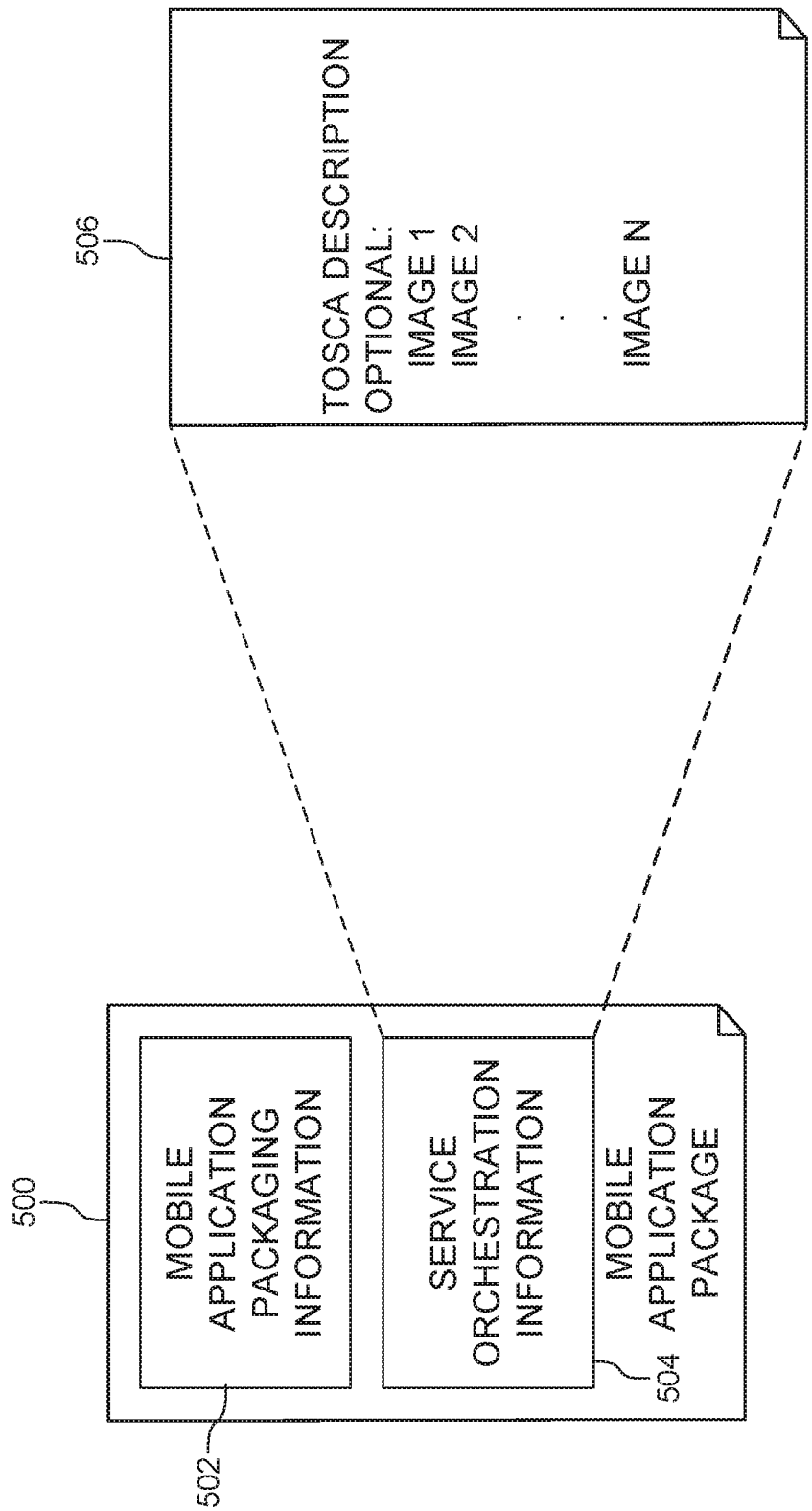
FIG. 5 illustrates an example of a mobile application package, in accordance with some embodiments.

FIG. 5 illustrates an example of packaging information in a mobile application package 500 for device-initiated service deployment, in accordance with some embodiments.

As shown in FIG. 5, multiple information sets may be incorporated into a single mobile application package 500. As shown, packaging information included in the mobile application package 500 may include (a) mobile application packaging information 502, that includes local application information including local application components for local application installation, and (b) service orchestration information (service deployment information) 504 for remote service deployment. As depicted in FIG. 5, the service orchestration information 504 may include a TOSCA-based orchestration template 506, as well as optional information on compute/storage images ("Image 1" . . . "Image N") to be used, e.g., as either VM (virtual machine) or container images packaged separately using image packaging methods well-known to those skilled in the art.

As one example, in some embodiments, any deployment template(s) carrying suitable descriptor(s) (e.g., an NSD and associated VNFD(s), as described above) may be specified using TOSCA, and included in the orchestration template 506. Further, in some embodiments, the descriptors and any image(s) and/or image link(s) associated therewith for the purpose of service deployment may be packaged together in the orchestration template 506, such as in the form of VNF Package(s), for instance, for on-boarding in an NFV infrastructure. In some (e.g., other) embodiments, Docker charts and, e.g., Kubernetes (generally a platform for managing containerized workloads and services, such as container orchestration system for Docker containers) may be used to provide a virtualization infrastructure. In some embodiments, Kubernetes may be one of several tools that can help deploy Docker containers.

In some embodiments, the additional service orchestration information 504 may be placed into a sub-folder of a so-called "/asset" folder of, e.g., an Android® mobile application package. In some embodiments, package installers may be configured (e.g., programmed accordingly with suitable software) to search for such service orchestration information in certain folders, extract the information and act according to the extracted information. For large image sizes, external APK (Android® Package Kit) expansion files may be used in some embodiments. Currently, up to 4 GB of image information can be included in a mobile application package. That 4 GB could be sufficient to contain a number of container-based service instances to be deployed in a network, such as an orchestrated network infrastructure. In some embodiments, a combination of directly provided image(s) as well as linked image(s) could be utilized to make a use of a mobile device memory in an efficient manner. Although the above description focuses on Android® mobile devices, those skilled in the art will recognize that similar techniques and utilization of storage folders may also apply to other types of mobile devices (e.g., an iPhone® device).

Some example embodiments for service orchestration will now be described.

As described above, service orchestration is driven by a mobile application installation process. For this, in some embodiments, a package installer (e.g., in a mobile device) may utilize the service orchestration information in the packaging information as shown in FIG. 5.

Figure 6:
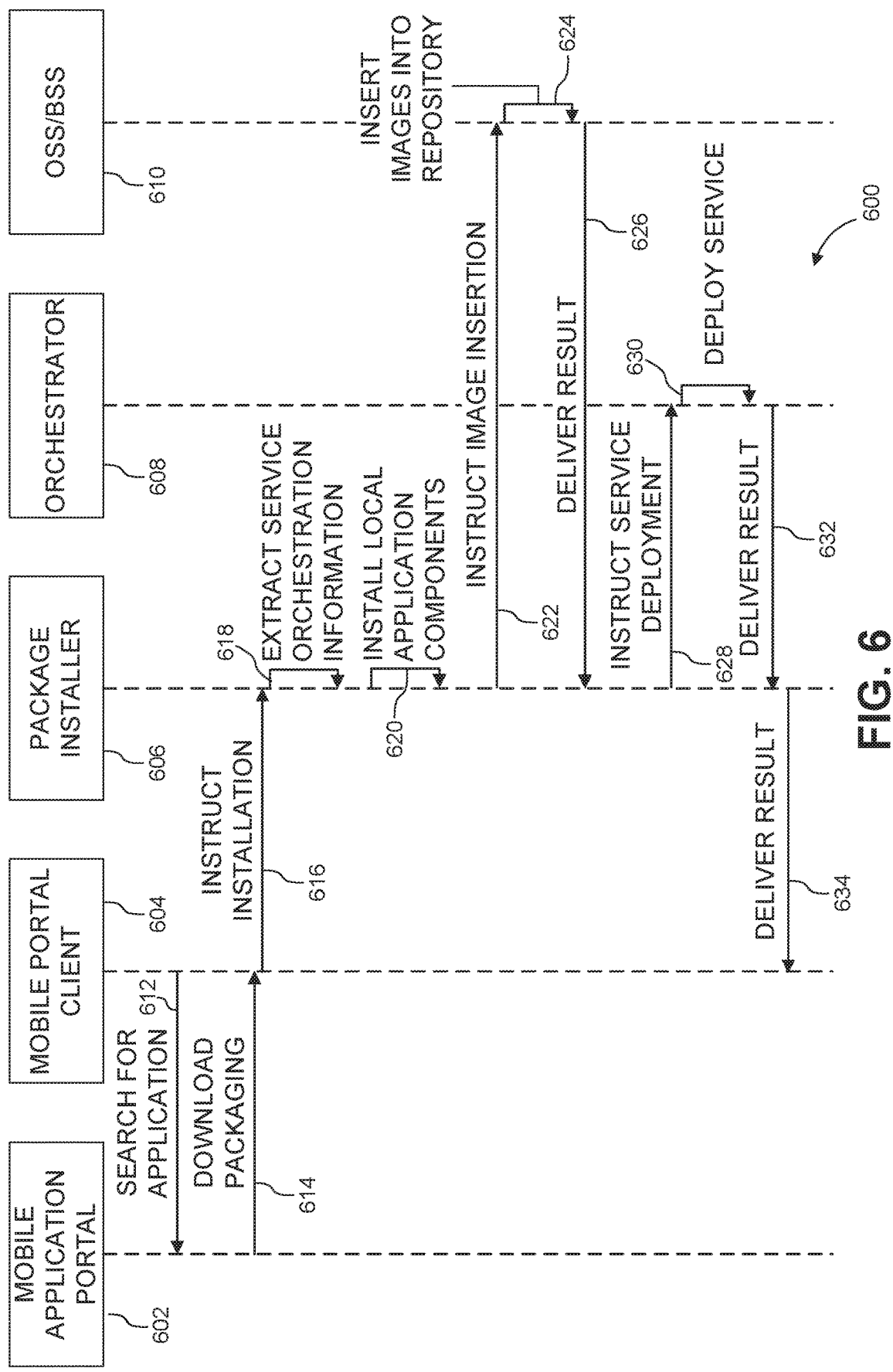
FIG. 6 is an example of a message sequence diagram, in accordance with some embodiments.

FIG. 6 is an example of a message sequence diagram 600, in accordance with some embodiments. FIG. 6 illustrates an example of signaling that may occur in some embodiments in which a mobile device-initiated service deployment may be carried out without a full OSS/BSS involvement. Note that, as used herein, a "full OSS/BSS involvement" generally refers to an involvement of OSS/BSS in a mobile device-initiated service deployment process for the purposes such as authentication, authorization, and accounting (AAA), as well as for image insertion.

In some embodiments, in a deployment without a full OSS/BSS involvement, a package installer, which may be modified as described above, instructs the OSS/BSS only for insertion of provided service images into an infrastructure repository. As explained above, in an NFV architectural framework, the repository for storing the service images may be typically located in a VIM. However, in other embodiments, such image repository may be located elsewhere. Further, in some embodiments, such insertion could be based on the actual images provided by the package installer after having been extracted from the mobile application (installation) package (downloaded from a mobile application portal by a mobile portal client). In some embodiments, the images could be provided as links to third party repositories from which the OSS/BSS can pull the image information as, for example, an HTTP or FTP download.

Note, however, that in some embodiments, image insertion performed by an OSS/BSS may be omitted, if, for example, the package installer relies, e.g., only on linked images, as noted earlier above. In such embodiments, the package installer may provide image link information directly to the orchestrator environment (e.g., a local orchestrator deployed in a given location) via, for instance, an authenticated access (e.g., an authentication token) or other form of a secured connection. In general, in some embodiments, an ability to provide an authenticated access to mobile users of, for example, a private network, may obviate a need for image insertion performed by an OSS/BSS. As such, in some embodiments, providing image(s) and/or image instruction(s) to the OSS/BSS may not be needed.

After that, the package installer may instruct an orchestrator (e.g., utilizing, in some embodiments, the aforementioned Os-Ma interface of the NFV infrastructure shown in FIG. 2) to deploy remote service components (provided as images such as those packaging, for instance, virtual machines or Docker containers) as described in the extracted service orchestration information that the package installer extracted from the package information. In some embodiments, e.g., alternative embodiments, the orchestrator may provide a REST (Representational State Transfer)-based interface that allows for sending the template directly for deployment. Such REST interface is being used, for instance, by the FLAME platform (as referenced above). The package information had earlier been provided by the mobile portal client after having been downloaded from the mobile application portal. In some embodiments, the orchestrator, after having attempted to deploy the service, may then deliver a result back to the package installer in the mobile device. In turn, the package installer may indicate the result to the portal client for user interaction (e.g., showing an indication of success or failure of an overall mobile application installation as a notification to the end user, similar to current application installation processes).

The example method described above, e.g., utilizing in part an OSS/BSS, may be summarized as follows:
1. An end user at, e.g., a mobile device, downloads combined mobile application packaging information and service deployment information (service orchestration information) from a mobile application repository via, e.g., a mobile portal client.
2. A package installer instructs an OSS/BSS to insert suitable service images (e.g., service endpoint images) into a service deployment repository (e.g., an image repository or other orchestration-based infrastructure depository) and instructs the orchestrator to deploy service components corresponding to the images.
3. The package installer delivers a result (e.g., a notification to the end user on success (or failure)) of an overall application installation.

In more detail, in an example method illustrated in FIG. 6, a user may download a mobile application package comprising combined mobile application packaging information that contains (1) local application information, including local application components, and (2) service deployment information (service orchestration information) from a mobile application repository, such as a mobile application portal 602. More specifically, at step 612, a mobile portal client 604 on a user mobile device, communicates with the mobile application portal 602 and searches for a mobile application selected for a download by the user. At step 614, the mobile application packaging is downloaded onto the mobile device via the mobile portal client 604. At step 616, the mobile portal client 604 instructs the package installer 606 to install the mobile application package. At steps 618 and 620, the package installer 606 processes the information in the mobile application package (packaging). Namely, at step 618, the package installer 606 extracts the service orchestration information, and at step 620, the package installer 606 installs the local application components on the mobile device.

Based on the extracted service orchestration information, at step 622, the package installer 606 may instruct (via suitable transmission from the mobile device) an OSS/BSS 610 to insert suitable images into a repository, unless, as noted above, the image information is provided as links to images in which case the OSS/BSS steps 622/624 may not be necessary in accordance with some embodiments. For example, with regards to an NFV infrastructure, at step 624, the OSS/BSS 610 may communicate with the orchestrator 608 and provide the images for insertion by the orchestrator 608 into the repository. In this regard, as noted above, the orchestrator 608, such as a NFVO, may pass the images to a VIM that typically includes an image repository. Then, at step 626, the OSS/BSS 610 may communicate with the package installer 606 to deliver a result of the image insertion. If the package installer 606 receives an indication that the image insertion into the repository has been successful, the package installer 606 instructs the orchestrator 610 to deploy a service associated with the downloaded mobile application. To deploy the service, the orchestrator 610 may pull the images from the repository and instantiate those images in a suitable manner on the NFVI.

At step 630, the orchestrator deploys the service. At step, 632, the orchestrator 608 may deliver a result of the service deployment to the package installer 606. In turn, at step 634, the package installer 606, may deliver the result (e.g., an indication of a success or failure) to the mobile portal client 604. Although not explicitly shown, the mobile portal client 604 may provide a notification of an overall application installation for presentation to the user on the mobile device. In some embodiments, the overall application installation takes into account a success or failure of both the local application installation and the remote service deployment. Hence, from the perspective of the user, the entire application installation process is performed transparently, even though at least some of the application functionality is virtualized if the service deployment has been successful.

Figure 7:
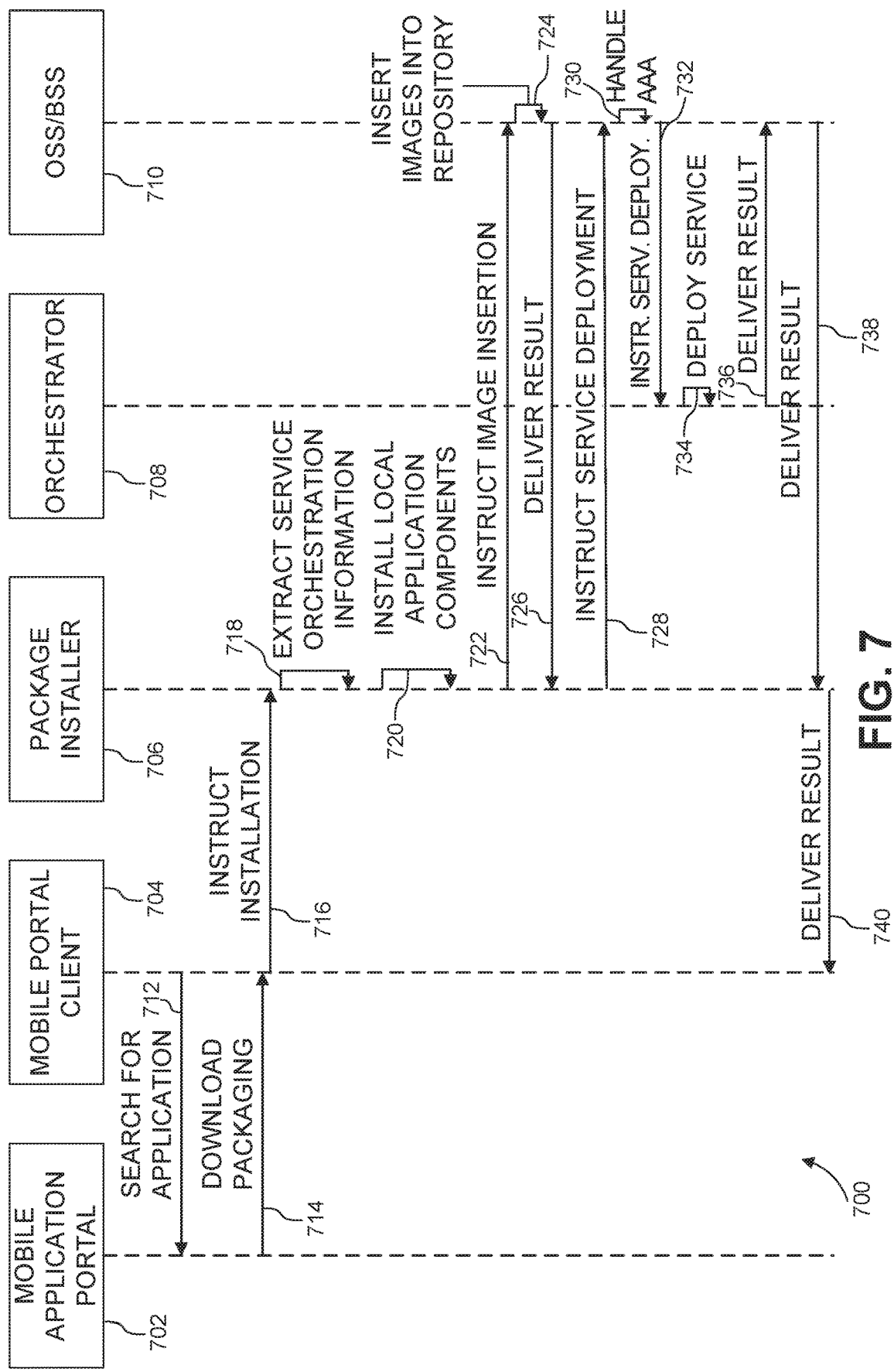
FIG. 7 is another example of a message sequence diagram, in accordance with some embodiments.

FIG. 7 is another example of a message sequence diagram 700, in accordance with some embodiments. FIG. 7 illustrates an example of signaling that may occur in a mobile device-initiated service deployment that may be carried out with a full OSS/BSS involvement.

In an example method illustrated in FIG. 7, an OSS/BSS is utilized for AAA (authentication, authorization, and accounting) purposes. In an example operation, a package installer may interact with the OSS/BSS not only for a possible publication of service images to an infrastructure repository, but also to send service deployment instructions to the OSS/BSS. The OSS/BSS may then instruct an orchestrator (e.g., utilizing, in some embodiments, the aforementioned Os-Ma interface of the NFV infrastructure as shown in FIG. 3) after performing a successful AAA procedure. Such AAA procedure of the OSS/BSS could be based on suitable identification of a mobile subscriber (who would normally be billed for mobile device usage and services) to verify authorization to install service components with the orchestrator, as well as to direct suitable billing for the NFV infrastructure usage to either a mobile subscriber or through business interfaces towards a service provider of the mobile subscriber. A final result of the service deployment, e.g., indicating a failure or success of the service deployment, may then be propagated back to an end user in a similar manner through result delivery. The mobile subscriber and the end user may be the same or different (e.g., an end user on a corporate account or a family plan).

In some embodiments, the OSS/BSS could identify the mobile subscriber associated with a mobile device providing a service deployment request through a suitable identification information in a service deployment information. One example of such suitable identification information is a mobile subscriber identification module (SIM), although other ways of identifying the mobile subscriber are possible as well.

Further, in some embodiments, the OSS/BSS could identify the service provider through suitable information in the service deployment information. In one example, the service provider may be identified using a Uniform Resource Locator (URL) included in the service deployment information. However, other ways of identifying the mobile subscriber are possible as well.

The example method described above, e.g., utilizing fully an OSS/BSS, may be summarized as follows:

1. An end user at, e.g., a mobile device, downloads combined mobile application packaging information and service deployment information (service orchestration information) from a mobile application repository via, e.g., a mobile portal client.

2. A package installer instructs an OSS/BSS to insert suitable service images (e.g., service endpoint images) into a service deployment repository (e.g., an image repository or other orchestration-based infrastructure depository), and the OSS/BSS then instructs an orchestrator, via the Os-Ma NFV interface, to deploy service components corresponding to the images.

3. The package installer delivers a result (e.g., a notification to the end user on success (or failure)) of an overall application installation.

In an example method illustrated in FIG. 7, a user may download a mobile application package comprising combined mobile application packaging information that contains (1) local application information, including local application components, and (2) service deployment information (service orchestration information) from a mobile application repository, such as a mobile application portal 702. More specifically, at step 712, a mobile application client 704 on the user mobile device, communicates with the mobile application portal 802 and searches for a mobile application selected for a download by the user. At step 714, the mobile application packaging is downloaded onto the mobile device via the mobile portal client 702. At step 716, the mobile portal client 702 instructs the package installer 706 to install the mobile application package. At steps 718 and 720, the package installer 706 processes the information in the mobile application package (packaging). Namely, at step 718, the package installer 706 extracts the service orchestration information, and at step 720, the package installer 706 installs local application components on the mobile device.

Based on the extracted service orchestration information, at step 722, the package installer 706 may instruct (via suitable transmission from the mobile device) an OSS/BSS 710 to insert suitable images into a repository, unless, for example, as noted above, the image information in the service deployment information is provided as links to images in which case the steps 722/724 involving the OSS/BSS 710 may be omitted in accordance with some embodiments. For example, with regards to an NFV infrastructure, at step 724, the OSS/BSS 710 may communicate with the orchestrator 708 and provide the images for insertion by the orchestrator 708 into the repository. In this regard, as noted above, the orchestrator 708, such as a NFVO, may pass the images to a VIM that typically includes an image repository. Then, at step 726, the OSS/BSS 710 may communicate with the package installer 706 as to whether an image insertion has been completed. Once the package installer 706 receives an indication of a successful insertion of images into the repository, at step 728, the package installer 706 may instruct the OSS/BSS 710 to deploy the service associated with the downloaded mobile application.

At step 730, the OSS/BSS 710 may perform an AAA procedure to verify authorization to install service components via the orchestrator 706, as well as to direct suitable billing. If the AAA procedure is successful, at step 732, the OSS/BSS 710 may instruct the orchestrator 706 to deploy the service associated with the downloaded mobile application. To deploy the service, the orchestrator 708 may pull the images from the repository and instantiate those images in a suitable manner on the NFVI. At step 734, the orchestrator 708 may deploy the service. Then, at step, 736, the orchestrator 708 may deliver a result of the service deployment to the OSS/BSS 710. In turn, at step 738, the OSS/BSS 710 may deliver the result directly to the package installer 706. At step 740, the package installer 706, may deliver the result (e.g., an indication of a success or failure) to the mobile portal client 704.

Although not explicitly shown, the mobile portal client 704 may then provide a notification of an overall application installation for presentation to the user on the mobile device. In some embodiments, the overall application installation takes into account success or failure of both the local application installation and the remote service deployment. Hence, from the perspective of the user, the entire application installation process is performed transparently, even though at least some of the application functionality is virtualized if the service deployment has been successful.

In some embodiments, to implement interfaces for communication between entities in FIGS. 6 and 7 (e.g., between a package installer and an orchestrator and/or OSS/BSS), interfaces similar to REST-based application programming interfaces, as in the baseline NFV infrastructure, may be utilized. Alternatively, in other embodiments, infrastructure providers can realize any necessary interfaces as proprietary (so-called northbound) interfaces to mobile application providers (such as a package installer), and can make suitable documentation available for realization of the package installer communication. In this case, the package installer may act as such a northbound interface from an infrastructure provider perspective.

As illustrated above, in some embodiments, device-initiated NFV-based service deployment occurs as a part of mobile application installation. However, other implementations are possible, alone or in combination. In some embodiments, example device-initiated orchestration processes, as, e.g., shown in FIGS. 6 and 7 may be dynamically executed after the initial application installation, such as when a user invokes already-installed application on their device, rather than upon an initial application install (e.g., upon only an initial application install).

In some embodiments, a decision of whether service deployment is to be dynamically re-executed every time the application is invoked (or possibly after some predetermined period of time after an initial installation of the application) may be specified in service description instructions in a service orchestration template (as described above) included in a mobile package. One example, in accordance with some embodiments, of an instance when a service orchestration may need to be re-executed after an initial installation of a mobile application is when, for instance, a user mobile device is in a location where a provider of a local NFV infrastructure (with whom, e.g., a mobile carrier has an agreement with) is different from that which initially configured in-network service elements upon the application installation.

Similarly, in some embodiments, if multiple users download the same mobile application requiring a deployment of the same service(s), service deployment instructions contained in the application's packaging, may specify how those service(s) should be deployed on a given NFV infrastructure or other similar programmable network/orchestrated platform. In one embodiment, those service(s) could be dynamically deployed every time any user installs that application. This may be the case if, for example, a service provider bills for any additional virtualized network service associated with the application. However, in other embodiments, different implementations may be possible. For example, in some embodiments, some services (or parts thereof) could be virtualized as shared services.

In addition, in some embodiments, device-centric orchestration of at least some of a service functionality of a mobile application may, e.g., lead to a more efficient utilization of service provider's network resources. For example, as noted above, by triggering a network service virtualization through a mobile application installation, a service provider (e.g., a mobile network operator) may not have to perform a wide deployment of given service(s) associated with mobile applications across the service provider's existing infrastructure. Instead, upon an installation process of a mobile application, a mobile device may dynamically utilize local orchestration points (e.g., a NFVO within a particular local NFVO infrastructure). In this regard, a user may access a trusted app store (e.g., a carrier-operated app portal, Play Store, Apple Store, etc.) and download a selected mobile application onto their mobile device. Since, according to the present example, the downloaded app is not operator-dependent, the mobile device may utilize, e.g., local virtualization platform(s) to make an efficient use of operator's network resources without, e.g., ever needing to communicate with the trusted app store after the download.

To illustrate, in some embodiments, if a user mobile device is operating in a first location A, upon an installation of a mobile application, the mobile device may initiate a service deployment by directing image insertion instructions to a first local NFV infrastructure (e.g., to a local NFVO via OSS/BSS) providing virtualized network services in an area covering the first location A. On the other hand, when the user mobile device moves to a second location B, upon an installation of another mobile application or invoking previous application downloaded in the first location A, the mobile device may initiate a service deployment by directing image insertion instructions to a second local NFV infrastructure (e.g., to a local NFVO via OSS/BSS) providing virtualized network services in an area covering the second location B.

In some embodiments, to utilize, e.g., a local NFV infrastructure, a mobile device may be configured (e.g., programmed with suitable software/firmware) to employ a given discovery process to find local orchestration points. In some embodiments, communication with orchestration points may involve local-only names (e.g., 'orchestrator.local') in order to provide, for instance, service orchestration requests, etc. In some implementations, those requests may be resolved by a local DNS (Domain Name System) server, and forwarded to, e.g., the nearest orchestration point.

In various embodiments described above, some example steps may include:
1. At a mobile device (e.g., mobile terminal):
   a. Download a mobile application package from a mobile application repository.
   b. Extract local application information and service deployment information from the mobile application package for instructions.
   c. A local application installer installs local components of the mobile application, according to the extracted local application information.
2. An OSS/BSS inserts suitable service images into a service deployment repository.
3. An orchestrator deploys a service, according to the extracted service deployment information.
4. The local application installer receives the service deployment result from the orchestrator.
5. The local application installer notifies a mobile user of an overall result of the application installation for the local installation and the remote service deployment.

Figure 8:
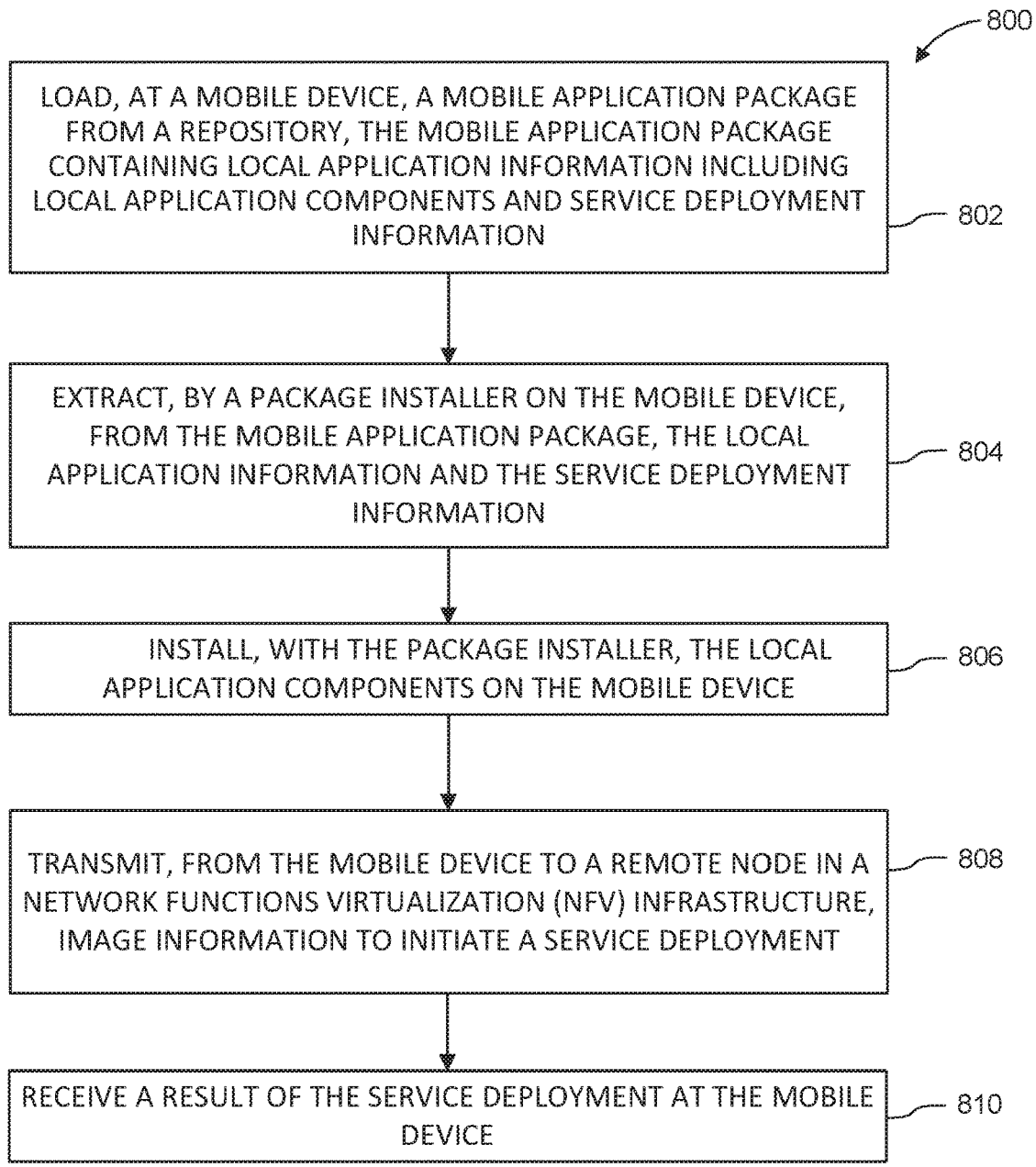
FIG. 8 is a flow chart illustrating an example method for device-initiated service deployment, in accordance with some embodiments.

FIG. 8 is a flow chart illustrating an example method 800 for device-initiated service deployment, in accordance with some embodiments. According to some embodiments, at step 802, a mobile application package is loaded from a repository at a mobile device. The mobile application package contains local application information including local application components and service deployment information. At step 804, a package installer on the mobile device extracts the local application information and the service deployment information, and at step 806, installs the local application components on the mobile device. At step 808, image information to initiate a service deployment is transmitted from the mobile device to a remote node in a Network Functions Virtualization (NFV) infrastructure. Then, at step 810, the mobile device receives a result of the service deployment.

Example embodiments for, e.g., extending existing package installers will now be described.

In some embodiments, existing package installers, such as those available for Android®-based devices, for instance, can be extended beyond a local application installation by a separate realization of the extraction of a service orchestration template from the APK information received in an application download, and sending service deployment information via network communication to an OSS/BSS and/or orchestrator according to messaging shown in FIGS. 6 and 7, respectively. Such separate realization, however, still manifests the realization of a logically combined package information as shown in FIG. 4.

By way of example, in one embodiment, the standard installer of an Android®-based mobile device could be used to install "standard" stand-alone mobile applications (mobile applications whose service functionality is fully integrated into the application's package) to a mobile device, while an extended installer may be provided as, e.g., a vendor-installed package installer, providing access to a vendor mobile application portal. Such a portal, in contrast with a standard mobile application portal, could provide access to mobile applications that include the necessary service deployment information, with the vendor-installed package installer configured appropriately to implement, e.g., the messaging communication of FIG. 6 or 7, to not only install the local application components but also deploy any necessary service elements in a network. In this embodiment, the extended installer could also be configured appropriately to handle any necessary business interfaces for charging for the additional benefit of deployment of service(s) corresponding to the mobile application on the network.

Some example use cases in accordance with some embodiments will now be described.

As a general matter, a given service may typically be disintegrated into smaller services (e.g., specific functions) that may be referred to as microservices. Consider a monolithic mobile application (a mobile application that comes packaged with a full service functionality for download) providing a video viewing service. Such a monolithic application may, e.g., include a number of separate microservices, such as, e.g., a video playout microservice and a transcoding microservice.

In some embodiments, mobile applications may be designed in a manner that specific operations are realized as microservices with HTTP-based interfaces between separate microservices. Communication between separate microservices can be mapped onto efficient inter-process communication (IPC) when a microservice exists locally, while deflecting the interaction to the HTTP-based protocol stack to remote devices. For deflections, however, suitable service instances may be needed, deployed in suitable service locations, such as servers or other mobile terminals, for necessary communication to occur. Suitable service deployment information can be added to the mobile application packaging, according to FIG. 5 for instance, and an extended package installer can deploy the necessary service instances remotely in the infrastructure.

As part of a video viewing service according to an example use case, a service provider may use a first microservice instance for video playout and a second microservice instance for transcoding, e.g., from 4K to a lower resolution format, such as HD (High Definition) video. The microservice for the video playout may be shared across multiple users, while the transcoding microservice may be specific to a given end user. Both may be provided as containers (e.g., Docker containers) on compute nodes in a network, such as an NFV infrastructure. Apart from the mobile application (which, in this example, serves as a playout client), service deployment information may include information to deploy a video playout server (if, e.g., it has not yet been installed by another user), as well as to specifically deploy the transcoding microservice for which the given end user may be charged The deployment of the additional, user-specific transcoding instance may be then charged separately as a basic video service fee for the additional functionality. In such a scenario, according to some embodiments, the mobile application installation would instruct the system to deploy those instances, as described above.

In another example, consider a mobile application providing a VR-based streaming service. In this example, a display microservice may be used to offload a display function onto another device, such as a smart TV, for a better viewing experience, while maintaining control on the mobile device. In operation, a user may download the mobile application (e.g., the mobile application 404, as in FIG. 4) from a mobile application portal (e.g., a trusted portal) such as an app store (e.g., the mobile application portal 410, as in FIG. 4). The downloaded mobile application package (e.g., the mobile application package 406, as in FIG. 4) may include service deployment information (e.g., the service orchestration information 504, as in FIG. 5) to deploy a display server so that the display microservice may be virtualized. During an installation of the packaged application, a local application installer (package installer) (e.g., the package installer 414, as in FIG. 4) may extract the service deployment information from the package and initiate an orchestration process of the display microservice (e.g., initiate the orchestration process via the OSS/BSS 418 and the orchestrator 416, as shown in FIG. 4 and described in more detail above). As a result of the orchestration process, the display microservice may be deployed remotely, e.g., in an NFV infrastructure (e.g., cloud-based infrastructure) as a user-specific microservice (for which, e.g., the user may be charged separately) or possibly as a shared microservice that may be shared among multiple mobile users. Further, an SDN-based network architecture may be used to interconnect the mobile device and the display device (e.g., the smart TV) to any suitable network components in order, for example, to provide a more efficient data routing.

Thus, some embodiments described herein may allow for utilization of (e.g., non-unique) microservices shared by multiple users as well as (e.g., more specific or targeted or even customized) microservices that may be available to a particular user or users (but, e.g., not to all users), e.g., using on MA services provided by an OSS/BSS.

Further, various related embodiments have been described hereinabove.

According to some embodiments, a method may include: at a mobile device, downloading a mobile application package from a mobile application repository; and extracting local application information and service deployment information from the mobile application package to cause: (a) a local application installer to install local application components on the mobile device, according to the extracted local application information, and (b) an Operation Support System/Business Support System (OSS/BSS) of a Network Functions Virtualization (NFV) infrastructure to insert service images into a service deployment repository, wherein the OSS/BSS instructs an orchestrator to deploy a service according to the extracted service deployment information.

According to some embodiments, a method may include: downloading combined mobile application packaging information and service deployment information from a mobile application repository; instructing an OSS/BSS of a Network Functions Virtualization (NFV) infrastructure to insert service images into an infrastructure repository; instructing an orchestrator to deploy the service images so as to deploy a corresponding service; and delivering a notification to an end user on a success or failure of an overall application installation.

According to some embodiments, a method may include: downloading combined mobile application packaging information and service deployment information from a mobile application repository; instructing an OSS/BSS of a Network Functions Virtualization (NFV) infrastructure to insert service images into an infrastructure repository and to instruct an orchestrator, via an Os-Ma NFV interface in the NFV infrastructure, to deploy the service images so as to deploy a corresponding service; and delivering a notification to an end user on success (or failure) of overall application installation.

According to some embodiments, a method may include: presenting a user with an experience that provides the user with a conventional software application installation experience but results in an installation of a mobile software application whose functionality is to be at least partially implemented with virtualized network services, where the method may include: presenting the mobile software application as a download option from an application store; upon receiving a user selection of the download option, downloading a mobile application package containing mobile application packaging information and service deployment information from a mobile application repository; instructing an OSS/BSS of a Network Functions Virtualization (NFV) infrastructure to insert service images into a repository; instructing a deployment of service components corresponding to the images via a communication with an orchestrator; and delivering a notification to the user on success or failure of an overall installation of the mobile software application.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described herein in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:
1. A method comprising:
   at a mobile device, loading a mobile application package from a repository, the mobile application package containing local application information including local application components and service deployment information;

extracting, by a package installer on the mobile device, from the mobile application package, the local application information and the service deployment information;

installing, with the package installer, the local application components on the mobile device;

transmitting, from the mobile device to a remote node in a Network Functions Virtualization (NFV) infrastructure, image information to initiate a service deployment; and receiving a result of the service deployment at the mobile device.

2. The method of claim 1, further comprising providing to a user, on the mobile device, an indication of a result of an overall mobile application installation.

3. The method of claim 1, wherein the image information includes image insertion instructions, and wherein the mobile device transmits the image insertion instructions to an Operation Support System/Business Support System (OSS/BSS) of the NFV infrastructure.

4. The method of claim 3, further comprising:
the OSS/BSS communicating service deployment instructions to an orchestrator.

5. The method of claim 4, wherein the OSS/BSS communicates the service deployment instructions to the orchestrator after performing a successful authentication, authorization, and accounting (AAA) procedure.

6. The method of claim 4, further comprising:
responsive to receiving the service deployment instructions, the orchestrator deploying a service and reporting the result of the service deployment to at least the mobile device.

7. The method of claim 1, wherein the image information includes one or more links to respective images, and wherein the mobile device transmits the one or more image links to an orchestrator.

8. The method of claim 1, further comprising:
the mobile device transmitting service deployment instructions to an orchestrator.

9. A method comprising:
at a mobile device, downloading a mobile application package from a mobile application repository, the mobile application package containing local application information including local application components and service deployment information;

extracting, by a package installer on the mobile device, the local application information and the service deployment information from the mobile application package; and initiating service deployment from the mobile device to cause:
(a) the package installer at the mobile device to install local application components on the mobile device, according to the extracted local application information,
(b) an Operation Support System/Business Support System (OSS/BSS) to insert service images into a service deployment repository, and
(c) an orchestrator to deploy a service in a programmable network, according to the extracted service deployment information.

10. The method of claim 9, further comprising receiving a result of the service deployment from the orchestrator at the mobile device.

11. The method of claim 10, wherein the result of the service deployment is received at the OSS/BSS, and wherein receiving the result of the service deployment from the orchestrator comprises receiving the result from the OSS/BSS.

12. The method of claim 10, further comprising notifying a user of the mobile device of a result of an overall mobile application installation.

13. The method of claim 12, wherein the notifying the user of the mobile device of the result of the overall mobile application installation is based on the result of the service deployment and a result of the local application components on the mobile device.

14. The method of claim 12, wherein if the overall mobile application installation is successful, functionality of the downloaded mobile application is at least partially virtualized.

15. The method of claim 9, wherein the programmable network comprises a Network Functions Virtualization (NFV) infrastructure.

16. The method of claim 9, wherein the mobile application repository is an application store, and wherein a mobile application packaged in the mobile application package is a download option from the application store.

17. The method of claim 9, wherein the programmable network is a combination of a Network Functions Virtualization (NFV) infrastructure and a Software-Defined Networking (SDN) infrastructure.

18. A mobile device comprising:
a processor; and
a memory, the memory storing instructions operative, when executed by the processor, to cause the processor to:
load a mobile application package from a repository, the mobile application package containing local application information including local application components and service deployment information;
extract, by a package installer on the mobile device, from the mobile application package, the local application information and the service deployment information;
install, with the package installer, the local application components on the mobile device;
transmit, from the mobile device to a remote node in a Network Functions Virtualization (NFV) infrastructure, image information to initiate a service deployment; and
receive a result of the service deployment at the mobile device.

19. The mobile device of claim 18, wherein the image information includes image insertion instructions, and wherein the mobile device transmits the image insertion instructions to an Operation Support System/Business Support System (OSS/BSS) of the NFV infrastructure.

20. The mobile device of claim 18, wherein the image information includes one or more links to respective images, and wherein the mobile device transmits the one or more image links to an orchestrator.

* * * * *